United States Patent [19]
Galanti

[11] Patent Number: 5,400,578
[45] Date of Patent: Mar. 28, 1995

[54] APPARATUS FOR RAKING AND BALING CUT CROP MATERIAL

[76] Inventor: Marcello B. Galanti, 1265 W. Finck Rd., Tracy, Calif. 95376

[21] Appl. No.: 230,212

[22] Filed: Apr. 20, 1994

[51] Int. Cl.⁶ ............... A01D 43/02; A01D 78/04; A01D 78/10; A01F 15/10
[52] U.S. Cl. ............................... 56/341; 56/11.9; 56/377
[58] Field of Search ............ 56/341, 11.9, 366, 377, 56/370, 396, 343

[56] References Cited

U.S. PATENT DOCUMENTS

| | | | |
|---|---|---|---|
| 2,731,782 | 1/1956 | Mason | 56/11.9 |
| 3,896,613 | 7/1975 | van der Lely | 56/370 |
| 3,910,019 | 10/1975 | Schlittler | 56/367 |
| 4,056,923 | 11/1977 | Zweegers | 56/366 |
| 4,182,103 | 1/1980 | McNutt | 56/364 |
| 4,263,774 | 4/1981 | DeCoene | 56/370 |
| 4,330,986 | 5/1982 | van der Lely et al. | 56/377 |
| 4,367,622 | 1/1983 | Aron et al. | 56/364 |
| 4,703,612 | 11/1987 | Webster | 56/11.9 |
| 4,864,809 | 9/1989 | van der Lely et al. | 56/377 |
| 4,914,901 | 4/1990 | Aron | 56/370 |
| 5,127,217 | 7/1992 | Fell et al. | 56/341 |

FOREIGN PATENT DOCUMENTS 2305928 10/1976 France ................... 56/341

Primary Examiner—Stephen J. Novosad
Attorney, Agent, or Firm—Thomas R. Lampe

[57] ABSTRACT

A mobile baler machine is combined with raking apparatus which includes two rotatable rake members which consolidate cut crop material during travel of the baler machine and present a single row of raked and consolidated cut crop material to the baler machine.

10 Claims, 4 Drawing Sheets

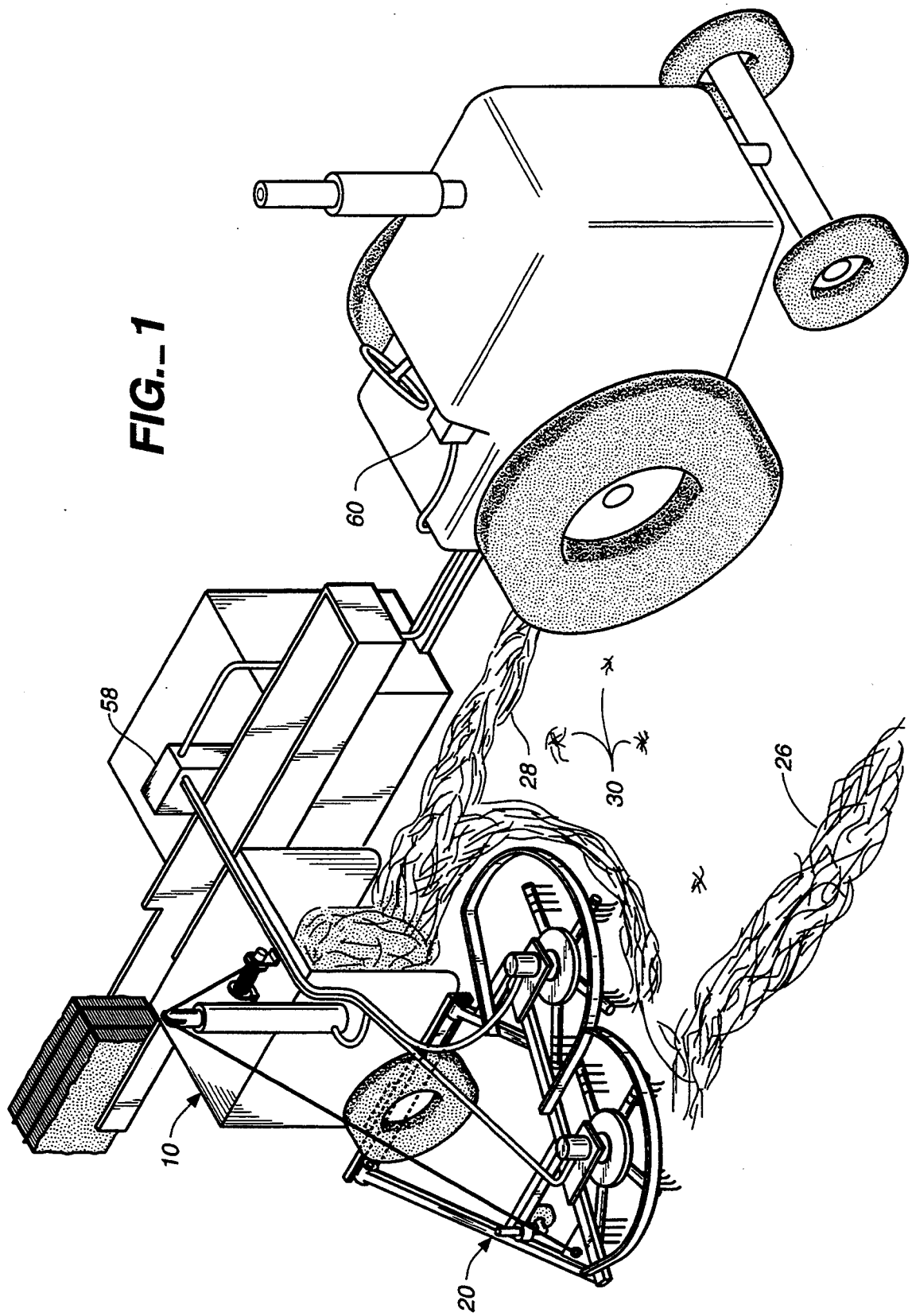
FIG._1

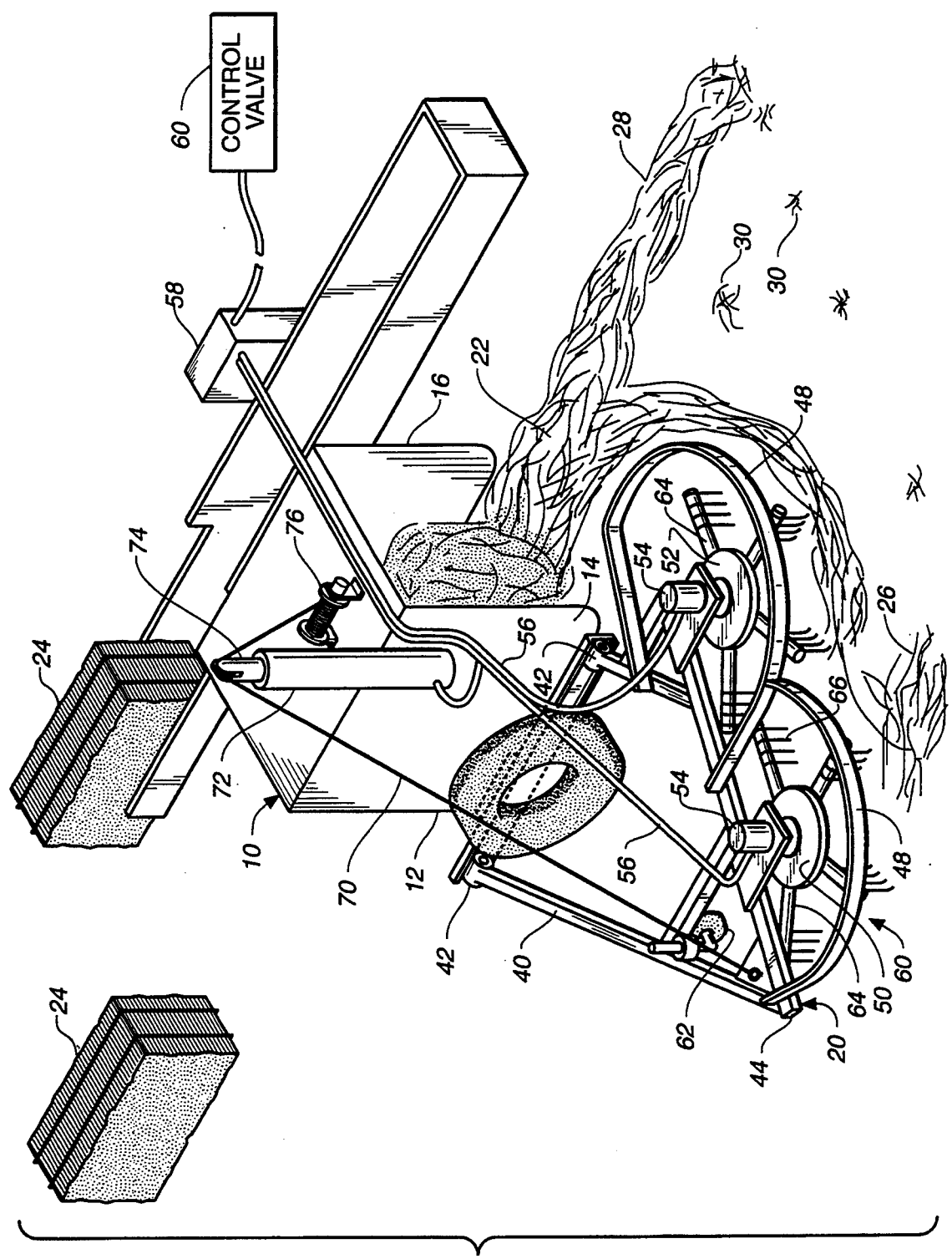
FIG._2

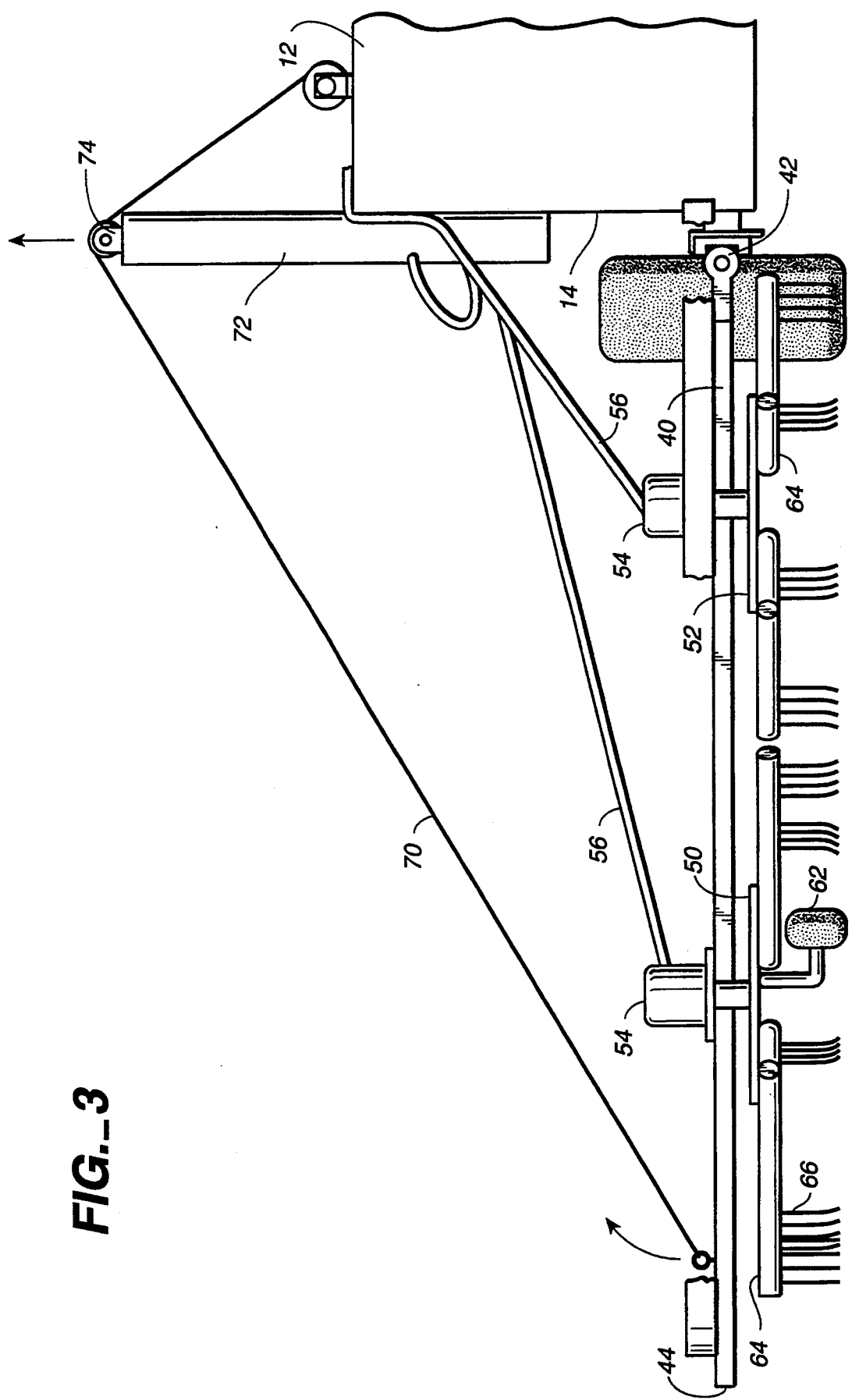
FIG._3

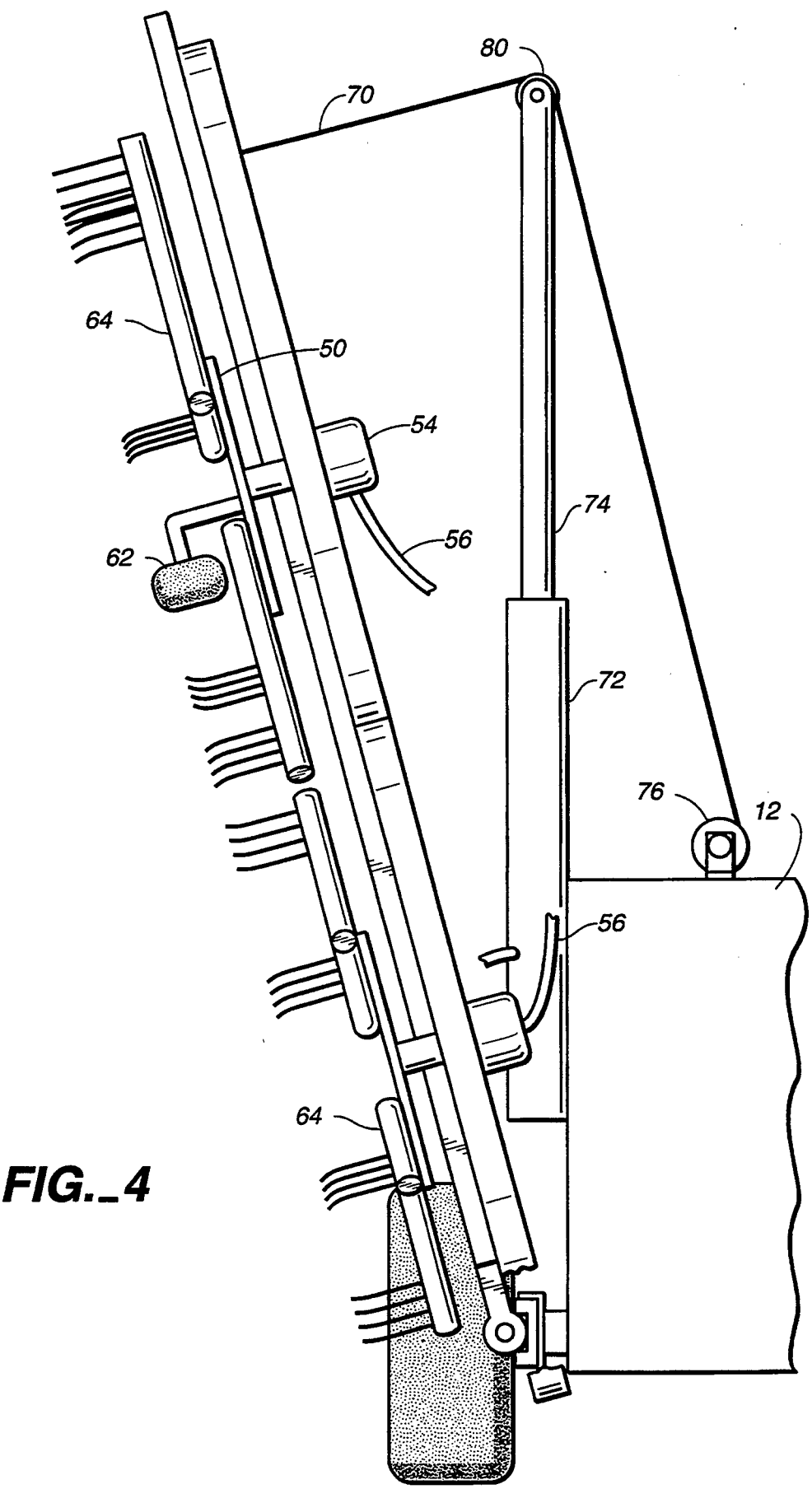
FIG._4

5,400,578

APPARATUS FOR RAKING AND BALING CUT CROP MATERIAL

TECHNICAL FIELD

This invention relates to apparatus which rakes and consolidates cut crop material and forms a row of raked and consolidated cut crop material at the entry opening of a mobile baler machine. The invention clears the ground of the cut crop material over a wide path in a highly efficient manner, enabling a plurality of spaced windrows of hay or the like to be consolidated and baled in a single pass of the baler.

BACKGROUND ART

It is well known to work cut grasses, hays or other crops on the field to form rows of the material which are dried and then baled at a later time by conventional baler machine equipment which is directed along each row. Applicant is aware of the following United States patents which disclose rakes of various types which are utilized to rake hay and similar crops: U.S. Pat. No. 3,910,019, issued Oct. 7, 1975, U.S. Pat. No. 4,914,901, issued Apr. 10, 1990, U.S. Pat. No. 4,263,774, issued Apr. 28, 1981, U.S. Pat. No. 3,896,613, issued Jul. 29, 1975, U.S. Pat. No. 4,367,622, issued Jan. 11, 1983, U.S. Pat. No. 4,056,923, issued Nov. 8, 1977, U.S. Pat. No. 4,330,986, issued May 25, 1982, and U.S. Pat. No. 4,864,809, issued Sep. 12, 1989.

The arrangements disclosed in the above-identified patents are believed to be representative of the state of the art of hay and other cut crop rakes per se.

U.S. Pat. No. 5,127,217, issued Jul. 7, 1992, discloses a round baler having a wide windrow converging mechanism connected to the round baler machine and directing crop material to the baler. More particularly, a pair of separate, obliquely disposed, angled-in rakes of the rotating tine bar type are mounted slightly forwardly of the baler pickup in the marginal areas alongside the path of travel of the pickup to engage outlying materials and converge them inwardly into the main portion of the windrow as the baler advances.

DISCLOSURE OF INVENTION

The present invention, as indicated above, allows for the consolidation of more than one windrow and directs the raked and consolidated cut crop material to a mobile baler machine to which the raking apparatus of the present invention is connected. Such an arrangement has considerable advantages with regard to both cost and time over prior art approaches wherein a baler machine typically bales a single row at a time. A field can be covered much more quickly utilizing the apparatus of the present invention and the apparatus also provides an approach for forming headland in a field, a headland being an area cleared of crops extending about the periphery of the field. The formation of a headland can be accomplished with a single pass utilizing the apparatus of the present invention as compared to the two passes required by conventional equipment. Loose scattered cut crop material is also effectively gathered with this invention.

The present invention includes a mobile baler machine including a baler housing having a side wall and defining a front opening adjacent to the side wall for receiving cut crop material during travel of said baler machine on the ground along a direction of movement.

The invention additionally includes raking apparatus connected to the baler machine and movable with the baler machine along the direction of movement to rake and consolidate cut crop material on the ground and form a single row of raked and consolidated cut crop material and present said single row of raked and consolidated cut crop material at said front opening.

The raking apparatus includes a frame pivotally connected to the baler machine and pivotally movable between an operating position wherein the frame projects substantially horizontally outwardly away from the baler machine side wall and a non-operating position wherein the frame is tilted upwardly relative to the ground alongside the baler machine side wall.

The raking apparatus also includes a first rotatable rake member having rake arms and a second rotatable rake member having rake arms. The rotatable rake members are rotatably supported by the frame at spaced locations on the frame.

Drive means is provided for simultaneously driving and rotating the rotatable rake members when the frame is in the operating position. The rake arms of the first rotatable rake member are operable to deliver cut crop material to the rake arms of the second rotatable rake member in a direction transverse to the direction of movement of the baler machine and raking apparatus when the frame is in the operating position.

The rake arms of the second rotatable rake member deliver cut crop material received thereby from the first rotatable rake member to the baler machine front opening in a direction transverse to the direction of movement of the baling machine. The raking apparatus also includes frame positioning means for moving the frame between the operating and non-operating positions.

The drive means includes hydraulic motors operatively associated with the rotatable rake members. The baler machine further includes a hydraulic pump and the drive means additionally includes conduit means extending between the hydraulic motors and the hydraulic pump.

Other features, advantages, and objects of the present invention will become apparent with reference to the following description and accompanying drawings.

BRIEF DESCRIPTION OF DRAWINGS

FIG. 1 is a perspective view of an embodiment of the invention including a baler machine and raking apparatus being pulled by a tractor;

FIG. 2 is an enlarged, perspective view of the device;

FIG. 3 is a frontal, elevational view of the raking apparatus with the frame thereof in operative position; and FIG. 4 is a view similar to FIG. 3 but illustrating the frame in inoperative position.

BEST MODE FOR CARRYING OUT THE INVENTION

Referring now to the drawings, a mobile baler machine 10 is illustrated. While the present invention is applicable to both self propelled baler machines and baler machines pulled by a tractor, the illustrated baler machine is of the type pulled by a tractor. The tractor is shown in FIG. 1 only in the interest of simplicity.

The baler machine 10 includes a baler housing 12 having a side wall 14. A front opening 16 (FIG. 2) is adjacent to the side wall 14 and is for receiving cut crop material during travel of the baler machine on the ground along a direction of movement. All of the foregoing structure is conventional.

Raking apparatus 20 is connected to the baler machine 10 and movable with the baler machine along the direction of movement of the baler machine. Raking apparatus 20 is for the purpose of raking and consolidating cut crop material on the ground and forming a single row 22 of raked and consolidated cut crop material. Row 22 is presented at the front opening 16 so that it can enter the baler which then forms bales 24. In the situation illustrated, consolidated row 22 is comprised of two windrows 26, 28 which are merged. Also, row 22 incorporates any loose cut crop material such as that indicated by reference numeral 30 disposed between windrows 26, 28.

Raking apparatus 20 includes an open frame 40 which is pivotally connected to the baler machine on pivots 42 located at the side wall 14. Frame 40 has an outer or distal end 44.

Rake members 50, 52 are rotatably mounted on frame 40 at spaced locations on the frame. Each rake member has operatively associated therewith a hydraulic motor 54, the hydraulic motors driving and rotating the rake members when pressurized hydraulic fluid is applied to the motors. Each hydraulic motor 54 is connected to a hose or conduit 56, the conduits leading to the hydraulic system 58 of the baler machine.

All conventional baler machines have a hydraulic system which is utilized to compress and form bales produced by the baler machine. Such structure being conventional, it will not be described herein. Suffice it to say that the conduits 56 receive pressurized hydraulic fluid from the hydraulic system, direct it to the hydraulic motors 54 and circulate the hydraulic fluid back into the hydraulic system. For this purpose the conduits 56 each define an inlet passageway leading to the motors and an outlet passageway leading away therefrom, such passageways being conventional and not illustrated in the interest of simplicity. A control valve 60 of any suitable type is utilized to open or close communication between the hydraulic system and the hydraulic motors at the will of the machine operator. If desired, the control valve may be positioned on the tractor.

FIGS. 1, 2 and 3 show raking apparatus 20 in its operating position wherein the frame 40 projects generally horizontally outwardly away from the baler machine side wall. In this position a support wheel 62 engages the ground to support the outer or distal end 44 of the frame.

Rake members 50, 52 have rake arms 64 radiating outwardly at spaced locations and having tines or forks 66 at the outer ends thereof. Application of pressurized hydraulic fluid to the hydraulic motors 54 will cause the rake members 50, 52 to turn in a counter-clockwise direction as viewed in FIGS. 1 and 2. Rake member 50 will rake cut crop material on the ground and deliver same to the rake arms of the rotating rake member 52 in a direction transverse to the direction of movement of the baler machine. Rake member 52 will deliver cut crop material received from rake member 50 to the baler machine front opening 16 in a direction transverse to the direction of movement of the baler machine. Thus, a very wide swath of material is directed to and processed by the baler machine. Frame 20 includes curved guard elements 48 which afford a degree of protection about the rake members.

When not in use, the raking apparatus has a feature allowing the frame to assume a non-operating position wherein the frame is tilted upwardly relative to the ground and disposed alongside the baler machine side wall. This position is shown in FIG. 4.

The apparatus for accomplishing such movement includes a cable 70 having one end thereof connected to end 44 of the frame. Cable 70 passes over a hydraulically powered cylinder 72 having a movable arm 74. The cable is looped over a sheave 80 rotatably deployed at the top of arm 74 and proceeds to a winch 76 on the baler housing. When the cable is taut and wrapped around the winch, actuation of the hydraulic cylinder 72 will cause the arm 74 to raise and thus also raise and tilt upwardly the frame 40. When the raking apparatus is in inoperative position closely adjacent to the side wall 14 of the baler machine housing, transport is facilitated.

I claim:

1. In combination:
    a mobile baler machine including a baler housing having a side wall and defining a front opening adjacent to said side wall for receiving cut crop material during travel of said baler machine on the ground along a direction of movement; and
    raking apparatus connected to said baler machine and movable with said baler machine along said direction of movement to rake and consolidate cut crop material on the ground, form a single row of raked and consolidated cut crop material, and present said single row of raked and consolidated cut crop material at said front opening, said raking apparatus including a frame pivotally connected to said baler machine and pivotally movable between an operating position wherein said frame projects generally horizontally outwardly away from said baler machine side wall and a non-operating position wherein said frame is tilted upwardly relative to the ground alongside said baler machine side wall, a first rotatable rake member having rake arms and a second rotatable rake member having rake arms, said rotatable rake members being rotatably supported by said frame at spaced locations on said frame, drive means for simultaneously driving and rotating said rotatable rake members when said frame is in said operating position, said rake arms of said first rotatable rake member operable to deliver cut crop material to the rake arms of said second rotatable rake member in a direction transverse to the direction of movement of said baler machine when said frame is in said operating position and the rake arms of said second rotatable rake member delivering cut crop material received thereby from the first rotatable rake member to said baler machine front opening in a direction transverse to the direction of movement of said baler machine, and frame positioning means for moving said frame between said operating and non-operating positions.

2. The combination according to claim 1 wherein said drive means includes hydraulic motors operatively associated with said rotatable rake members, said baler machine further including a hydraulic pump, and said drive means additionally including conduit means extending between said hydraulic motors and said hydraulic pump.

3. The combination according to claim 2 additionally comprising manually operable valve means for controlling the flow of hydraulic fluid in said conduit means to control the rotation of said rotatable rake members by said hydraulic motors.

4. The combination according to claim 1 additionally comprising mounting means on said baler machine side wall pivotally interconnecting said frame to said side wall.

5. The combination according to claim 4 wherein said frame has a distal end spaced from said baler machine side wall, said frame positioning means comprising flexible connector means connected to said distal end and to said baler machine housing and frame lifter means moving said flexible connector means relative to said frame and baler machine housing for exerting an upwardly directed force on said distal end to pivot the frame about said mounting means and move said frame from said operating position to said non-operating position.

6. The combination according to claim 5 wherein said flexible connector means comprises a cable, said frame lifter means including cable support means attached to said baler machine housing, extending upwardly therefrom and movable relative thereto, and a rotatable support sheave supporting said cable above said housing.

7. The apparatus according to claim 1 wherein said raking apparatus additionally includes at least one support wheel connected to said frame for engaging the ground at a location spaced from said baler machine to support said frame in said operating position.

8. The combination according to claim 1 wherein said frame includes safety guard frame members extending at least partially about said rotatable rake members.

9. The combination according to claim 6 wherein said frame lifter means additionally includes winch means on said baler machine housing for winding said cable.

10. The combination according to claim 5 wherein said frame lifter means includes selectively movable cylinder means connected to said flexible connector means to lift said flexible connector means and said frame.

* * * * *